US010070319B2

(12) United States Patent
Ezri et al.

(10) Patent No.: US 10,070,319 B2
(45) Date of Patent: Sep. 4, 2018

(54) ADVANCED DYNAMIC CHANNEL ASSIGNMENT

(71) Applicant: Huawei Technologies Co., Ltd., Shenzhen (CN)

(72) Inventors: Doron Ezri, Munich (DE); Avi Weitzman, Munich (DE); Shimi Shilo, Munich (DE); Fuqing Sun, Nanjing (CN); Wei Ruan, Suzhou (CN); Ronghu Fan, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 14/985,963

(22) Filed: Dec. 31, 2015

(65) Prior Publication Data
US 2016/0113026 A1    Apr. 21, 2016

Related U.S. Application Data

(63) Continuation of application No. PCT/EP2014/063932, filed on Jul. 1, 2014.

(51) Int. Cl.
| | |
|---|---|
| *H04W 4/00* | (2018.01) |
| *H04W 16/10* | (2009.01) |
| *H04W 84/12* | (2009.01) |
| *H04W 88/08* | (2009.01) |

(52) U.S. Cl.
CPC ............ *H04W 16/10* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2008/0151821 A1 | 6/2008 | Cho et al. | |
| 2009/0109855 A1 * | 4/2009 | Gong | ................... H04W 16/10 370/238 |
| 2009/0285165 A1 | 11/2009 | Berglund et al. | |

(Continued)

OTHER PUBLICATIONS

Foreign Communication From a Counterpart Application, PCT Application No. PCT/EP2014/063932, International Search Report dated Mar. 18, 2015, 4 pages.

(Continued)

*Primary Examiner* — Chi H Pham
*Assistant Examiner* — Fahmida Chowdhury
(74) *Attorney, Agent, or Firm* — Conley Rose, P.C.

(57) ABSTRACT

A device for assigning radio channels to radio transceiver devices. The device comprises an interface configured to receive two or more radio communication values, each associated with a radio transceiver device. The device comprises a processor configured to calculate an ordering of two or more radio transceiver devices based on radio communication values and build, according to the ordering, one or more rooted tree representing assignment of available radio channels to first radio transceiver devices according to the ordering. A branch of the rooted tree is selected according to a cost function value calculated along each branch. The processor is configured to assign the available radio channels to the radio transceiver devices according to the selected branch.

14 Claims, 17 Drawing Sheets

(56) References Cited

U.S. PATENT DOCUMENTS

| | | | | |
|---|---|---|---|---|
| 2012/0045024 A1* | 2/2012 | Cui | ......................... | H04L 1/005 |
| | | | | 375/341 |
| 2013/0288735 A1* | 10/2013 | Guo | ..................... | H04W 24/00 |
| | | | | 455/509 |
| 2014/0036787 A1* | 2/2014 | Ganu | .................... | H04W 16/10 |
| | | | | 370/329 |

OTHER PUBLICATIONS

Foreign Communication From a Counterpart Application, PCT Application No. PCT/EP2014/063932, Written Opinion dated Mar. 18, 2015, 6 pages.

\* cited by examiner

310

| Stage | 1 | 2 | Cost | Discard |
|---|---|---|---|---|
| AP | AP5 | AP2 | | |
| Combination | | | | |
| 311 | CH1 | CH1 | 1 | No |
| 312 | CH1 | CH2 | 0 | No |
| 313 | CH1 | CH3 | 0 | No |
| 321 | CH2 | CH1 | 0 | No |
| 322 | CH2 | CH2 | 1 | No |
| 323 | CH2 | CH3 | 0 | No |
| 333 | CH3 | CH1 | 0 | No |
| 332 | CH3 | CH2 | 0 | No |
| 333 | CH3 | CH3 | 1 | No |

| Stage | 1 | 2 | Stage Cost | 3 | Stage Cost | Total Cost | Discard |
|---|---|---|---|---|---|---|---|
| AP | AP5 | AP2 | | AP4 | | | |
| Combination | | | | | | | |
| 3111 | CH1 | CH1 | 1 | CH1 | 1.2512 | 2.2512 | Yes |
| 3112 | CH1 | CH1 | 1 | CH2 | 0 | 1 | Yes |
| 3113 | CH1 | CH1 | 1 | CH3 | 0 | 1 | Yes |
| 3121 | CH1 | CH2 | 0 | CH1 | 1 | 1 | Yes |
| 3122 | CH1 | CH2 | 0 | CH2 | 0.2512 | 0.2512 | No |
| 3123 | CH1 | CH2 | 0 | CH3 | 0 | 0 | No |
| 3131 | CH1 | CH3 | 0 | CH1 | 1 | 1 | Yes |
| 3132 | CH1 | CH3 | 0 | CH2 | 0 | 0 | No |
| 3133 | CH1 | CH3 | 0 | CH3 | 0.2512 | 0.2512 | No |
| 3211 | CH2 | CH1 | 0 | CH1 | 0.2512 | 0.2512 | No |
| 3212 | CH2 | CH1 | 0 | CH2 | 1 | 1 | Yes |
| 3213 | CH2 | CH1 | 0 | CH3 | 0 | 0 | No |
| 3221 | CH2 | CH2 | 1 | CH1 | 0 | 1 | Yes |
| 3222 | CH2 | CH2 | 1 | CH2 | 1.2512 | 2.2512 | Yes |
| 3223 | CH2 | CH2 | 1 | CH3 | 0 | 1 | Yes |
| 3231 | CH2 | CH3 | 0 | CH1 | 0 | 0 | No |
| 3232 | CH2 | CH3 | 0 | CH2 | 1 | 1 | Yes |
| 3233 | CH2 | CH3 | 0 | CH3 | 0.2512 | 0.2512 | No |
| 3311 | CH3 | CH1 | 0 | CH1 | 0.2512 | 0.2512 | No |
| 3312 | CH3 | CH1 | 0 | CH2 | 0 | 0 | No |
| 3313 | CH3 | CH1 | 0 | CH3 | 1 | 1 | Yes |
| 3321 | CH3 | CH2 | 0 | CH1 | 0 | 0 | No |
| 3322 | CH3 | CH2 | 0 | CH2 | 0.2512 | 0.2512 | No |
| 3323 | CH3 | CH2 | 0 | CH3 | 1 | 1 | Yes |
| 3331 | CH3 | CH3 | 1 | CH1 | 0 | 1 | Yes |
| 3332 | CH3 | CH3 | 1 | CH2 | 0 | 1 | Yes |
| 3333 | CH3 | CH3 | 1 | CH3 | 1.2512 | 2.2512 | Yes |

95% confidence level for total cost = 0.273

| Stage | 1 | 2 | Stage Cost | 3 | Stage Cost | 4 | Stage Cost | Total Cost | Discard |
|---|---|---|---|---|---|---|---|---|---|
| AP | AP5 | AP2 | | AP4 | | AP6 | | | |
| Combo | | | | | | | | | |
| 31221 | CH1 | CH2 | 0 | CH2 | 0.2512 | CH1 | 1 | 1.2512 | Yes |
| 31222 | CH1 | CH2 | 0 | CH2 | 0.2512 | CH2 | 0.3143 | 0.5655 | Yes |
| 31223 | CH1 | CH2 | 0 | CH2 | 0.2512 | CH3 | 0 | 0.2512 | Yes |
| 31231 | CH1 | CH2 | 0 | CH3 | 0 | CH1 | 1 | 1 | Yes |
| 31232 | CH1 | CH2 | 0 | CH3 | 0 | CH2 | 0.2512 | 0.2512 | Yes |
| 31233 | CH1 | CH2 | 0 | CH3 | 0 | CH3 | 0.0631 | 0.0631 | No |
| 31321 | CH1 | CH3 | 0 | CH2 | 0 | CH1 | 1 | 1 | Yes |
| 31322 | CH1 | CH3 | 0 | CH2 | 0 | CH2 | 0.0631 | 0.0631 | No |
| 31323 | CH1 | CH3 | 0 | CH2 | 0 | CH3 | 0.2512 | 0.2512 | Yes |
| 31331 | CH1 | CH3 | 0 | CH3 | 0.2512 | CH1 | 1 | 1.2512 | Yes |
| 31332 | CH1 | CH3 | 0 | CH3 | 0.2512 | CH2 | 0 | 0.2512 | Yes |
| 31333 | CH1 | CH3 | 0 | CH3 | 0.2512 | CH3 | 0.3143 | 0.5655 | Yes |
| 32111 | CH2 | CH1 | 0 | CH1 | 0.2512 | CH1 | 0.3143 | 0.5655 | Yes |
| 32112 | CH2 | CH1 | 0 | CH1 | 0.2512 | CH2 | 1 | 1.2512 | Yes |
| 32113 | CH2 | CH1 | 0 | CH1 | 0.2512 | CH3 | 0 | 0.2512 | Yes |
| 32131 | CH2 | CH1 | 0 | CH3 | 0 | CH1 | 0.2512 | 0.2512 | Yes |
| 32132 | CH2 | CH1 | 0 | CH3 | 0 | CH2 | 1 | 1 | Yes |
| 32133 | CH2 | CH1 | 0 | CH3 | 0 | CH3 | 0.0631 | 0.0631 | No |
| 32311 | CH2 | CH3 | 0 | CH1 | 0 | CH1 | 0.0631 | 0.0631 | No |
| 32312 | CH2 | CH3 | 0 | CH1 | 0 | CH2 | 1 | 1 | Yes |
| 32313 | CH2 | CH3 | 0 | CH1 | 0 | CH3 | 0.2512 | 0.2512 | Yes |
| 32331 | CH2 | CH3 | 0 | CH3 | 0.2512 | CH1 | 0 | 0.2512 | Yes |
| 32332 | CH2 | CH3 | 0 | CH3 | 0.2512 | CH2 | 1 | 1.2512 | Yes |
| 32333 | CH2 | CH3 | 0 | CH3 | 0.2512 | CH3 | 0.3143 | 0.5655 | Yes |
| 33111 | CH3 | CH1 | 0 | CH1 | 0.2512 | CH1 | 0.3143 | 0.5655 | Yes |
| 33112 | CH3 | CH1 | 0 | CH1 | 0.2512 | CH2 | 0 | 0.2512 | Yes |
| 33113 | CH3 | CH1 | 0 | CH1 | 0.2512 | CH3 | 1 | 1.2512 | Yes |
| 33121 | CH3 | CH1 | 0 | CH2 | 0 | CH1 | 0.2512 | 0.2512 | Yes |
| 33122 | CH3 | CH1 | 0 | CH2 | 0 | CH2 | 0.0631 | 0.0631 | No |
| 33123 | CH3 | CH1 | 0 | CH2 | 0 | CH3 | 1 | 1 | Yes |
| 33211 | CH3 | CH2 | 0 | CH1 | 0 | CH1 | 0.0631 | 0.0631 | No |
| 33212 | CH3 | CH2 | 0 | CH1 | 0 | CH2 | 0.2512 | 0.2512 | Yes |
| 33213 | CH3 | CH2 | 0 | CH1 | 0 | CH3 | 1 | 1 | Yes |
| 33221 | CH3 | CH2 | 0 | CH2 | 0.2512 | CH1 | 0 | 0.2512 | Yes |
| 33222 | CH3 | CH2 | 0 | CH2 | 0.2512 | CH2 | 0.3143 | 0.5655 | Yes |
| 33223 | CH3 | CH2 | 0 | CH2 | 0.2512 | CH3 | 1 | 1.2512 | Yes |

95% confidence level for total cost = 0.148

FIG. 3G

ADVANCED DYNAMIC CHANNEL ASSIGNMENT

CROSS-REFERENCE TO RELATED APPLICATION

This application is a continuation of International Application No. PCT/EP2014/063932, filed on Jul. 1, 2014, which is hereby incorporated by reference in its entirety.

BACKGROUND

This application, in some embodiments thereof, relates to wireless radio network and, more specifically, but not exclusively, to assigning channels to radio transceiver devices in a wireless radio network.

In many wireless systems, such as wireless local area networks (WLANs), broadcast systems and/or wireless cellular networks, the system includes multiple overlapping and/or non-overlapping electromagnetic radiation frequency channels. When the system also includes multiple radio transceiver devices, for example WiFi™ access points (APs) or cellular base stations, one or more channels are assigned to each radio transceiver. As used herein, the terms channel assignments and/or allocations are used interchangeably to mean the configuration of a radio transceiver to use a particular channel of a base frequency. As used herein, the terms radio transceiver and/or access point mean a WLAN access point, a broadcast network transmitter, a wireless cellular network base station, and the like. Channel assignment to each transceiver may be static or dynamic. The detailed examples of some embodiments of methods and devices described herein are taken primarily from wireless local area networks for simplicity and clarity, yet other embodiments of the methods and devices may be applicable to other radio resource sharing technologies, such as broadcast systems and/or wireless cellular networks.

In WLANs, optimal channel assignment may be found by trying all possible combinations of channels for all APs in the system, and picking the channel combination that optimizes a cost function and/or network goal, as in combinatorial optimization. Suboptimal approaches may include AP grouping, Iterative, and Round-robin Iterative methods. The AP grouping method may divide the APs into small groups and then divide channels within groups. The Iterative method may allocate a channel to the AP with highest interference to reduce that interference, wait for a short period, such as a few minutes, and then repeat. The Round-robin Iterative method may order all APs according to interference, allocate a channel to the first AP in the ordered list, wait for a short period, such as a few minutes, repeat the process again for the next AP in the ordered list, and continue until all APs have been assigned. When the ordered list is completed, the process repeats again starting with a new ordering.

SUMMARY

According to an aspect of some embodiments of the present invention there is provided a device for assigning radio channels to radio transceiver devices. The device comprises an interface configured to receive two or more radio communication values, each radio communication value being associated with a radio transceiver device. The device comprises a processor configured to calculate an ordering of two or more radio transceiver devices based on the two or more radio communication values. The processor is configured to build, according to the ordering, one or more rooted tree (each) having a root and two or more tree stages. Each one of the two or more tree stages represents one of the two or more radio transceiver devices chosen according to the ordering, the root representing an assignment of one of two or more available radio channels to a first radio transceiver device according to the ordering. Each node in each of the two or more tree stages represents an assignment of one of the two or more available radio channels to one of the two or more radio transceiver devices represented by a corresponding one of the two or more tree stages. Each edge is associated with an edge value equal to an incremental cost function value calculated from the two or more radio communication values. The processor is configured to select a branch of the rooted tree according to a final cost function value calculated from the edge values along the branch. The branch comprises all nodes and edges along a path from the root to a leaf of the branch and wherein the branch defines a selection of one of the two or more available radio channels for each of the two or more radio transceiver devices. The processor is configured to assign the two or more available radio channels to the two or more radio transceiver devices according to the selected branch.

Optionally, the interface is configured to receive two or more radio communication values, and the two or more radio communication values are any from the list of an interfering electronic noise, a radio frequency electromagnetic radiation Gaussian noise, a radio frequency electromagnetic radiation white noise, a radio transceiver interference, a mutual radio transceiver interference, an off-network radio transceiver interference for which a channel assignment cannot be performed, a radio transceiver load, a radio transceiver priority, a radio transceiver utilization, radio transceiver transmission energy, and radio transceiver reception energy.

Optionally, the interface is configured to receive two or more mutual radio transceiver interference values, each of the two or more mutual radio transceiver interference values measured by one of the two or more radio transceiver devices based on the strength of a radio signal transmitted from a second of the two or more radio transceiver devices.

Optionally, the processor is configured to calculate the incremental cost function value for a given edge of the rooted tree based on all assignments of wireless channels to wireless radio transceiver devices in a path starting from the root of the tree along the given edge until a node at an end of the edge and the path.

Optionally, the processor is configured to calculate the final cost function comprising a sum of the edge values along the selected branch.

Optionally, the processor is configured to calculate the ordering based on an ordering function value computed from the radio communication values for each of the two or more radio transceiver devices, and a ranking of the ordering function value.

Optionally, the processor is configured to modify the ordering by one or more rearranging of the ordering.

Optionally, the processor is configured to stratify the ordering into groups and to randomly rearrange the ordering within each stratified group.

Optionally, the processor is configured to remove one or more incomplete branch during building of the rooted tree, based on an intermediate cost function comprising a sum of the edge values along the incomplete branch.

Optionally, the processor is further configured to remove one or more incomplete branch during building of the rooted tree until a target number of surviving branches of the rooted tree is reached.

Optionally, the processor is further configured to remove one or more incomplete branch during building of the rooted tree based on a statistical ranking of the intermediate sum and statistical value threshold.

Optionally the processor is configured to repeat the calculate, build, and select actions two or more times with different variations of the ordering, and assign the two or more available radio channels to the two or more radio transceiver devices according to a preferred channel combination resulting from the two or more times.

Optionally, the processor is configured to build one rooted tree for each available radio channel assigned to the first radio transceiver device according to the ordering.

According to an aspect of some embodiments of the present invention there is provided a method for assigning available radio channels to radio transceiver devices connected to a radio network. The method comprises receiving two or more radio communication values, each radio communication values being associated with one of two or more radio transceiver devices. The method comprises calculating an ordering of the two or more radio transceiver devices based on the two or more radio communication values. The method comprises building, according to the ordering, one or more rooted tree each having a root and two or more tree stages. Each one of the two or more tree stages represents one of the radio transceiver devices chosen according to the ordering, the root representing an assignment of one of the available radio channels to a first radio transceiver device according to the ordering. Each node in each of the two or more tree stages representing an assignment of one of the two or more available radio channels to one of the two or more radio transceiver devices. Each edge is associated with an edge value equal to an incremental cost function value calculated from the two or more radio communication values. The method comprises selecting a branch of the rooted tree according to a final cost function value calculated from the edge values along the branch, wherein the branch comprises all nodes and edges along a path from the root to a leaf of the branch and wherein the branch defines a selection of one of the two or more available radio channels for each of the two or more radio transceiver devices. The method comprises assigning the two or more available radio channels to the two or more radio transceiver devices according to the selected branch.

According to an aspect of some embodiments of the present invention there is provided a computer program comprising for program code for performing the method as described herein, when the computer program runs on a computer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually automatically, or a combination thereof. Moreover, according to actual instrumentation and equipment of embodiments of the method and/or system of the invention, several selected tasks could be implemented by hardware, by software or by firmware or by a combination thereof, optionally using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

FIG. 3E is a table of an example assignment of combinations of radio channels for two access points using wireless communication values, according to some embodiments of the invention.

FIG. 3F is further stages of the table shown in FIG. 3E, according to some embodiments of the invention.

FIG. 3G is further stages of the table shown in FIG. 3F, according to some embodiments of the invention.

DETAILED DESCRIPTION

Figure 1:
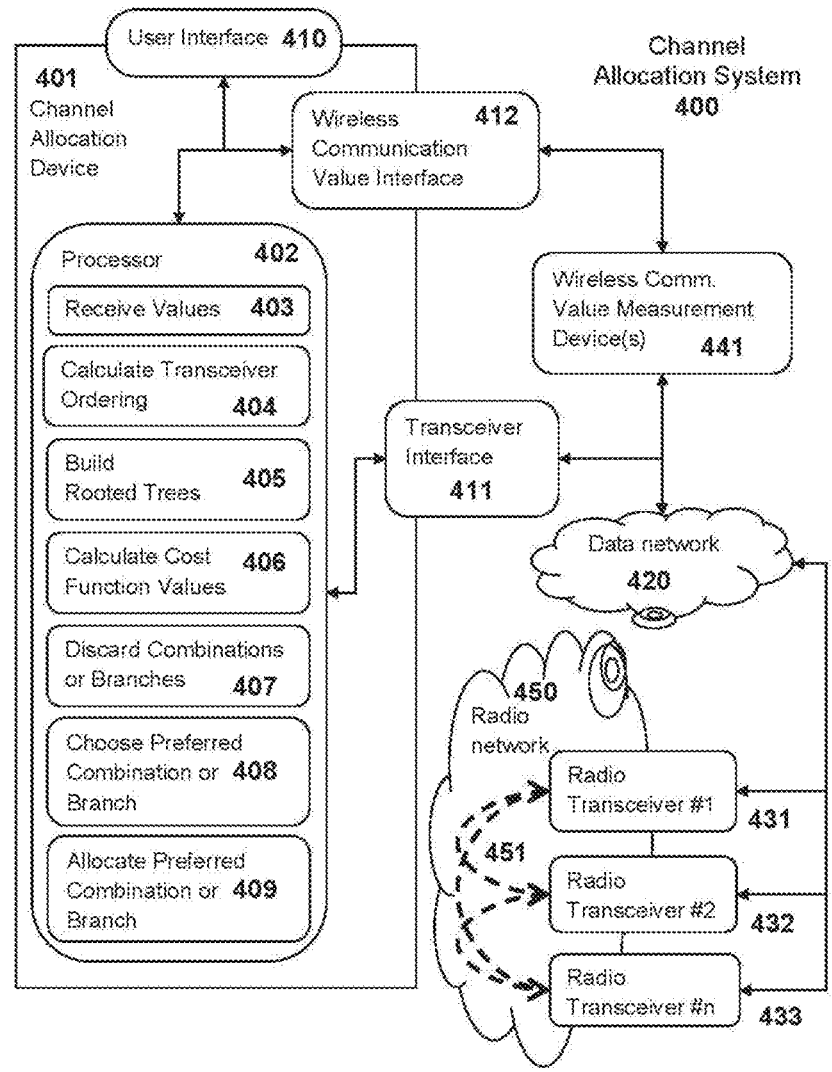
FIG. 1 is a schematic illustration of a system and device to allocate radio channels to radio transceivers, according to some embodiments of the invention.

In Institute of Electrical and Electronics Engineers (IEEE) 802.11 (Wi-Fi™), several unlicensed bands, such as 2.4 gigahertz (GHz), 3.8 GHz and 5 GHz bands, radiofrequency electromagnetic transmission are used between radio transceiver devices. In each band, more than one non-overlapping channel may be used to increase the data throughput on that band, for example channels 1, 6 and 11 in a 2.4 GHz band. To increase system capabilities and/or throughput capacity, several APs may share the same area but use different channels to minimize the interference between APs. Since the number of APs is usually larger than the number of available channels, several APs may be assigned the same channel. Nearby APs operating on the same channel may interfere with each other, so from an interference point of view it is important to distance APs operating on the same channel as much as possible. Since carrier sense multiple access (CSMA) is used in Wi-Fi, allowing stations to compete and share the same medium, nearby APs experiencing low load, for example serving few clients, may be assigned the same channel. Channel assignment may therefore be an important problem clearly influencing the system performance.

As known in combinatorial optimization problems, finding the best channel allocation within a system may be a complex task, which requires comparing $C^{N_{AP}}$ options, where C denotes the number of available channels and $N_{AP}$ denotes the number of APs in the system.

There are several disadvantages with some current implementations. For example, the computational complexity of the optimal solution is too high to implement in real time. The optimal solution is exhaustive and may require a huge number of calculations resulting in being a computationally prohibitive solution. For example, when there are 20 APs and 5 available channels, the best solution is selected out of a total of $5^{20} \approx 9.5 \cdot 10^{13}$ combinations.

In another example, the iterative radio channel allocation solution's run-time is very long, and the solution converges to near-optimal very slowly. The AP grouping's solution may be far from optimal because there may be very high interference between adjacent groups.

According to some embodiments of the present invention, there are provided methods and computerized devices for determining automatically an optimal or near-optimal dynamic channel allocation (DCA) for two or more radio transceivers. A preferred DCA solution may be found by creating an ordered list of the radio transceivers according to one or more wireless communication values and an ordering function value used to rank the radio transceivers, and iteratively computing the effect of channel assignment combinations according to the ordered list. At each iteration, computing the effect of channel assignment combinations of the next radio transceivers on the list may be added to previous radio transceivers channel combinations, a cost function of one or more wireless communication values is computed for each combination, and channel combinations with high cost function values are discarded. In this manner the methods and computerized devices, according to some embodiments of the invention, may find the preferred DCA solution quickly and efficiently, even for large numbers of channels and radio transceivers.

The ordered list and cost functions of the partial and/or final computed effect of channel assignment combinations may be calculated automatically based on the one or more wireless communication values associated with each radio transceiver, for example, interference from transceivers on the controlled network, interference from transceivers on other networks, noise from radio and/or non-radio devices, load on the radio transceiver and neighboring radio transceivers, priority, utilization, and the like. For example, interference between two radio transceivers on the controlled network can be formed into a two dimension matrix of mutual interference values, calculated based on the strength of a signal received by one radio transceiver from a second radio transceiver.

By perturbation of the ordered list and repeating the process of finding the preferred combination, several near-optimal solutions may be computed and may be combined to find a preferred channel combination. For example, preferred channel combinations are combined by a mode function for each radio transceiver, such that the most abundant of preferred channels for a particular radio transceiver is assigned to that radio transceiver. Optionally, the best combination of the several near-optimal channel combinations calculated from several ordered lists is chosen for radio transceiver assignment.

The methods described herein, according to some embodiments of the invention, may be referred to collectively as a K-Best method to determine the preferred channel allocations to all APs.

Optionally, radio transceiver ordering is randomized. Optionally, the radio transceiver ordering is randomized in groups stratified by the wireless communication values. Optionally, radio transceiver ordering is a rank ordering of the wireless communication values. Optionally, radio transceiver ordering is a rank ordering of the wireless communication values, and ordering changed randomly by nearest neighbor swapping.

Optionally, the computerized channel allocation device that performs the K-Best method may be one of the access points of the network, a network controller, a master access point, a computerized server connected to the internet, a virtualized server, a computer, and the like.

Optionally, the wireless communication values are an interference value between any two radio transceivers on a specific channel. Optionally, the wireless communication values are an interference value between any two radio transceivers on all channels. Optionally, the wireless communication values are an interference value between any two radio transceivers on each channel. Optionally, the wireless communication values are an average load value of the rate of data transfer through each access point during a time period. Optionally, the wireless communication values are a priority value of client terminal radio network access priorities. Optionally, the wireless communication values are an interference value between each radio transceiver detects from surrounding non-network electronic equipment on one or more channels. Optionally, the wireless communication values are an energy value corresponding to the access point received energy. Optionally, the wireless communication values are a utilization value corresponding to a utilization rate for each access point. Optionally, the wireless communication values are an IEEE 802.11 interference value from neighboring networks and Wi-Fi devices.

Optionally, the channel combinations for each access point are limited to a subset of the total available radio channels due to non-network interference.

As the cost function equation may combine multiple wireless communication values, the cost function value may be computed from any mathematical function of the wireless communication values. For example, an exponential function, a logarithmic function, a root mean square function, and/or the like may be used as part of the cost function.

Optionally, discarding of combinations of radio channel allocations is performed when the number of members in the group of combinations is above a threshold. For example, all combinations are discarded except the 10 combinations with the lowest cost function values. Optionally, discarding of combinations of radio channel allocations is performed based on a ranking of the cost function, and discarding everything above a threshold percentile. For example, any combination with a cost function value above the $10^{th}$ percentile is discarded. Optionally, discarding of combinations of radio channel allocations is performed by a statistical confidence interval threshold. For example, any combination with a cost function value above the 95% confidence interval is discarded. Optionally, discarding of combinations of radio channel allocations is performed by a statistical variance based threshold. For example, the statistical variance of the cost function values is multiplied by a factor of two and subtracted from the mean of the cost function values, and any combination with a cost function value above this threshold is discarded. Optionally, discarding of combinations of radio channel allocations is performed by a threshold value. For example, any combination with a cost function value above 0.5 is discarded.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a system and device to allocate radio channels to radio transceivers, according to some embodiments of the invention. The system 400 for allocation of radio channels to radio transceivers comprises a computerized channel allocation device 401, optional one or more wireless communication value measurement devices 441, two or more radio transceivers, as at 431, 432, and 433, and a data network 420 to communicate between these the components. In this example illustration, the two or more radio transceivers, as at 431, 432, and 433 share the resources of a radio network 450 and may mutually interfere 451 with each other's radio communication due to the competition for these resources, such as choice of radio channel. In this example, the channel allocation device 401 comprises one or more processors 402 and one or more interfaces as at 410, 411 and 412. The processor 402 is configured to "automatically" receive wireless communication values 403 from two or more radio transceivers through a transceiver interface 411 and/or from a wireless communication value measurement device 441 through the data network 420 and/or a wireless communication value interface 412. A processor 402 configured to perform an action means that the processor has access to local memory storage that contains processor instructions to perform the described actions. The processor 402 is further configured to use the wireless communication values to calculate automatically an ordered list of the transceivers 404. The processor 402 is further configured to use the ordered list and wireless communication values to build automatically at least one rooted tree 405, where each branch of the rooted tree represents a combination of channel allocations. The processor 402 is further configured to automatically choose 408 the optimal channel combination, such as one branch of the rooted tree, for the radio transceivers that minimize a calculated 406 cost function value, and allocate 409 these channels through the transceiver interface 411. Optionally, instead of building rooted trees 405 the effect of channel combination assignments is computed using data tables, a relational database, and/or the like. Optionally, the processor 402 is configured to discard combinations of channel assignments 407 automatically, such as branches of the rooted tree, in order to optimize the search for the preferred channel assignment combination. Optionally, the transceiver interface 411 and the wireless communication value interface 412 are the same interface, such as an Ethernet interface, a universal serial bus interface, a wireless local area network interface, and the like.

According to some embodiments of the present invention, there are provided methods and systems for determining dynamic channel allocation for network connected radio transceivers based on an ordered list of the radio transceivers and iterative calculation of channel allocation combinations. At each iteration of the method based on the ordered list, channel combinations that have a high cost function value may be discarded prior to the next iteration, thus enabling a faster computation time and ensuring a close to optimal or optimal solution is found on completion.

Figure 2A:
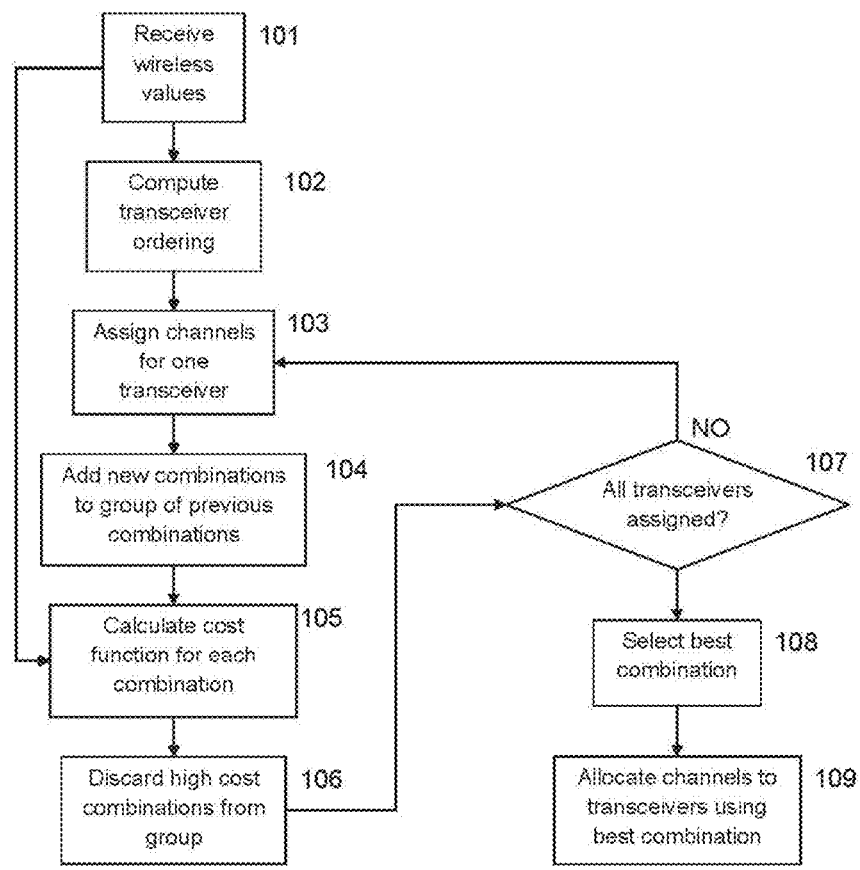
FIG. 2A is a flowchart of an example method to allocate radio channels to radio transceivers using a combination table data structure, based on an ordered search for preferred channel allocations, according to some embodiments of the invention.

Reference is now made to FIG. 2A, which is a flowchart of an example method to allocate radio channels to radio transceivers using a combination table data structure, based on an ordered search for preferred channel allocations, according to some embodiments of the invention. The processor 402 receives automatically 101 the wireless communication values associated with radio transceivers from the two or more radio transceivers (431, 432, 433 and the like) through the transceiver interface 411 and the data network 420 and/or from the wireless communication measurement device 441 through an interface as at 412 and/or 411. For example, each wireless communication value corresponds to one transceiver, and represents a value of the wireless communication quality measurements, settings, parameters, and utility goals. Optionally, the wireless communication values are interactions between transceivers operating on a specific channel, such as mutual radio interference values. Optionally, the mutual interference is measured separately for all channels. The wireless communication values may be measurements, parameters, and/or settings of the radio transceivers, and may be received from the radio transceivers, a controlling device, and/or other radio frequency electromagnetic radiation sensing devices.

The processor 402 uses the wireless communication values for computing automatically 102 one or more radio transceiver orderings, which in turn are used for iterative calculation of the effect of multiple combinations of radio channel assignments for potential allocation to the radio transceivers.

For each iteration, the processor 402 automatically computes the effect of channel assignments 103 for the next radio transceiver on the ordered list and adds 104 these combinations to a group of previous combinations. The processor 402 automatically computes 105 a cost function for each computed channel assignment combination in the group, based on a formula of the wireless communication values, and may automatically discard 106 one or more combinations from the group based on the cost function value. When the processor 402 discards any high cost function value channel combinations, the remaining combinations in the group may be referred to herein as the surviving combinations. This discarding action 106 by the processor 402 limits the combinatorial optimization method to combinations that have high probability of being optimal and/or near-optimal solutions. The processor 402 continues to automatically compute 107 a cost function value for each channel assignment combination to the remaining transceivers, until all transceivers have been assigned combinations of channels. The processor 402 automatically chooses 108 the preferred combination based on the respective computed cost function values for each final combination, and then uses the preferred channel combination to automatically allocate 109 radio channels to the transceivers 431, 432, 433, and the like. For example, the combination with the lowest cost function value is chosen as the preferred combination for radio transceiver channel allocation.

Optionally, no channel combinations are discarded. For example, at the first iteration all combinations are retained for the second iteration. Optionally, channel combinations are discarded according to a threshold. For example, the combinations with a cost function value above a threshold value are discarded. Optionally, channel combinations are discarded according to a percentile. For example, each combination is ranked by their cost function value, and the combinations with a rank above a rank threshold are discarded. Optionally, channel combinations are discarded according to a K-Best criterion. For example, the 10 lowest cost function channel combinations are retained for further computing of effects of channel assignment combinations. Optionally, the discarding criteria and/or ordering list of channel combinations are changed dynamically at any stage and/or iteration. For example, all channel combinations meet the criteria to be discarded, and the ordering function and/or cost function formula are replaced with alternative formulas.

The formulas for computing the ordered list, intermediate cost function and final cost function may be specifically defined to work together such that the processor 402 quickly computes the preferred channel allocations, according to some embodiments of the invention, and each formula may use different wireless communication values. For example, at each iteration the next radio transceiver in the ordered list is assigned possible channel combinations. These new channel combinations are added to the group of previous combinations, and an incremental cost function is added to the sum of incremental cost functions from the previous iterations.

Figure 2B:
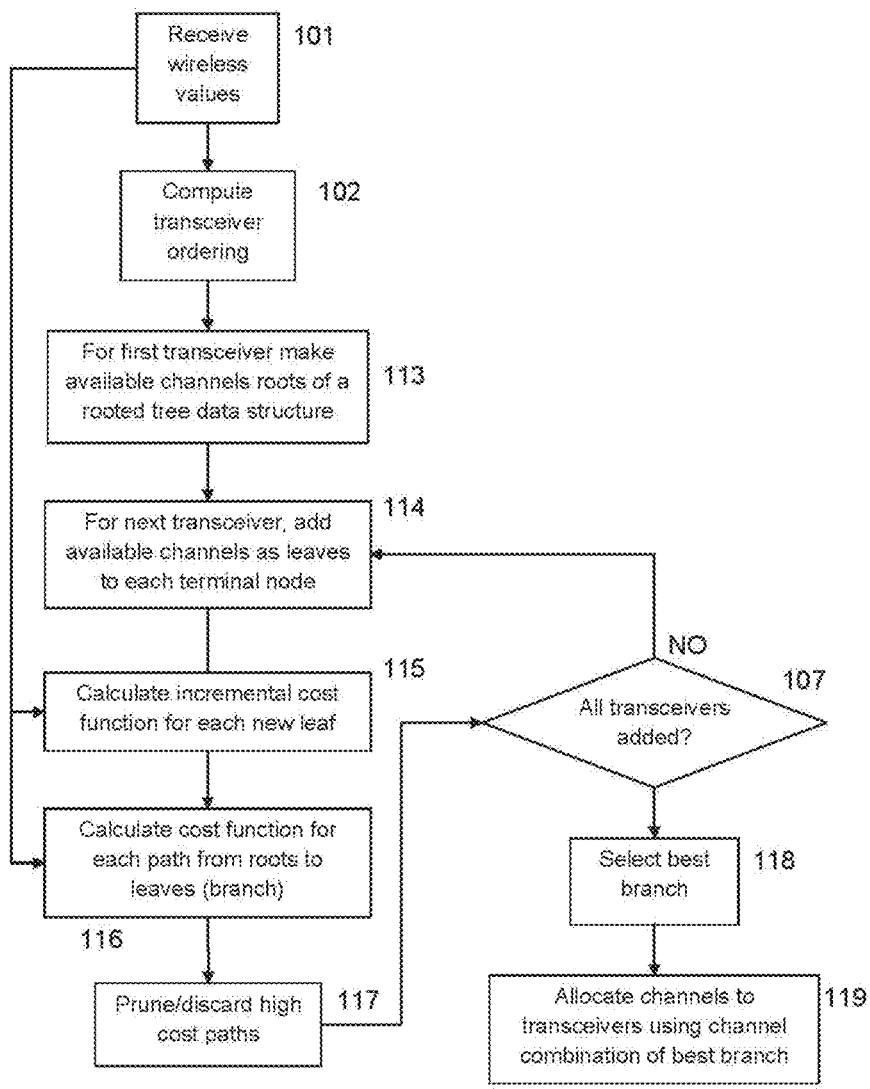
FIG. 2B is a flowchart of an example method to allocate radio channels to radio transceivers using a rooted tree data structure, based on an ordered search for preferred channel allocations, according to some embodiments of the invention.

Reference is now made to FIG. 2B, which is a flowchart of an example method to allocate radio channels to radio transceivers using a rooted tree data structure, based on an ordered search for preferred channel allocations, according to some embodiments of the invention. The processor 402 receives 101 the wireless communication values associated with radio transceivers from the two or more radio transceivers (431, 432, 433 and the like) through the transceiver interface 411 and the data network 420 and/or from the wireless communication measurement device 441 through the interface 412 and/or 411. For example, the wireless communication values represent per transceiver values of the wireless communication quality measurements, settings, parameters, and utility goals. Optionally, the wireless communication values are interactions between transceivers operating on a specific channel, such as mutual radio interference values. Optionally, the interference is measured per channel for all channels. The wireless communication values may be measurements, parameters, and or settings of the radio transceivers, and may be received from the radio transceivers, a controlling device, and/or other radio sensing devices. The processor 402 uses the wireless communication values for computing 102 one or more radio transceiver orderings, which in turn is used for iterative calculation of the effect on the cost function of multiple combinations of radio channel assignments for potential allocation to the radio transceivers 103.

The processor 402 builds a rooted tree structure in stages, where each stage represents one of the radio transceivers. The processor 402 selects the first radio transceiver from the ordered list, and assigns 113 an available radio channel for this transceiver as a root of one of the trees 113. The processor creates one rooted tree for each available wireless channel. The following steps can therefore be carried out per created rooted tree.

For the next transceiver on the ordered list, the processor 402 adds leaves 114 to each terminal node, such as the end nodes of previous iteration's leaves and computes 115, based on a formula using the wireless communication values, an incremental cost function value associated with the edge of each new leaf, referred to herein as an edge value. As used herein, the term terminal node means the nodes of a tree graph with valence one. In the case of the first iteration, as in the second stage, the leaves are connected to the roots created in the first stage. Each new leaf adds multiple paths between the roots and each new terminal node, referred to herein as branches. By calculating a sum of the edge values of each branch, a cost function can be computed 116 for each branch at this stage, and one or more branches may be discarded 117 from the rooted tree based on the cost function value and a discarding criterion. The processor 402 continues to add 117 leaves to the rooted trees until all transceivers have been added, one for each stage. The processor 402 chooses 118 the preferred branch based on the respective computed cost function values for each branch, and then uses the preferred channel combinations associated with the nodes of that branch to allocate 119 radio channels to the transceivers 431, 432, 433, and the like. For example, the branch with the lowest cost function value is chosen as the preferred combination of channels for radio transceiver channel allocation.

Assigning one or more shared radio resource to a network of radio transceivers may be associated with multiple radio infrastructure types. For example, in a cellular network radio channels are shared between cellular network base stations. For example, in a satellite radio networks radio channels are shared between satellite radio transceivers. For example, in a wireless local area networks radio channels are shared between access points. For example, in a broadcast networks radio channels are shared between broadcast stations. As used herein, the term access point means a radio transceiver as part of a network of radio transceivers sharing a common radio resource, such as a WLAN access point, a broadcast station, a cellular network base station and the like. The examples herein are described using an example of a WLAN access point radio channel allocation, but the methods and devices described herein may be applied to other networks of radio transceivers sharing radio resources.

A numerical example defining and solving DCA optimization will now be presented in this application, to exemplify the systems, devices, and methods presented herein. In the following examples, the abbreviation AP means access point. For example, one of the radio transceivers described in FIG. 1 as at 431, 432, 433 and the like may be an AP.

According to this numerical example, a group of N APs, where each i-th AP is allocated by a processor 402 a channel $f_i$ out of M possible channels, and channel $f_i$ overlaps other nearby radio channels. In this example, the APs are associated with an inter-AP interference value $r_{ij}$, which denotes the radio frequency electromagnetic interference experienced by the i-th AP from the j-th AP. The radio interference is measured by the AP devices themselves or by a separate measurement device 441. The value $r_{ij}$ denotes for example the link budget between the i-th AP and the j-th AP. Optionally, the value is the inverse interference, a power function of the interference, a function of the interference, the sum interference of all channels, the interference of one channel, the interference on each channel between each pair of APs, interference of the same and adjacent channels between each pair of APs, and the like. For example, inter-AP interference values are measured between all combinations of AP pairs to form a (mutual interference) matrix $R_{N \times N}$. For example, each AP is associated with a load value $L_1$ which denotes how loaded each AP is. For example, the load takes any value between 1 and 5, where 1 is a lightly loaded AP, whereas 5 is a highly loaded AP. One possible optimization criterion for the DCA problem is:

$$f_1, \ldots f_N = \underset{f_1 \in [1,\ldots,M]}{\operatorname{argmin}} r_{12} \cdot (f_1 = f_2) \cdot L_1 L_2 +$$

$$r_{13} \cdot (f_1 = f_3) \cdot L_1 L_3 + \ldots + r_{1N} \cdot (f_1 = f_N) \cdot L_1 L_N +$$

$$r_{23} \cdot (f_2 = f_3) \cdot L_2 L_3 + \ldots + r_{N-1,N} \cdot (f_{N-1} = f_N) \cdot L_{N-1} L_N$$

$$\text{where } (f_1 = f_j) = \begin{cases} 1, f_1 = f_j \\ 0, f_i \neq f_j \end{cases}$$

In the case of overlapping channels the above cost may be modified to:

$$f_1, \ldots f_N = \underset{f_1 \in [1,\ldots,M]}{\operatorname{argmin}} r_{12} \cdot \alpha_{12} \cdot (f_1 = f_2) \cdot L_1 L_2 +$$

$$r_{13} \cdot \alpha_{13} \cdot (f_1 = f_3) \cdot L_1 L_3 + \ldots + r_{1N} \cdot \alpha_{1N} \cdot (f_1 = f_N) \cdot L_1 L_N +$$

$$r_{23} \cdot \alpha_{23} \cdot (f_2 = f_3) \cdot L_2 L_3 + \ldots + r_{N-1,N} \cdot \alpha_{N-1,N} \cdot (f_{N-4} = f_N) \cdot L_{N-1} L_N$$

where $$(f_i = f_j) = \begin{cases} 1, f_i = f_j \\ 0, f_i \neq f_j \end{cases}$$

and $\alpha_{ij}$ corresponds to the overlapping factor between the i-th and the j-th APs. For example, $\alpha_{ij}$ is equal to 1 when there is a full overlap (the same channel), equal to 0 when there is no overlap at all, and any value between 0 and 1 when there is a partial overlap.

Similarly to the load value used above, utilization value, a priority value, and/or the like may be added to the cost function. For example, a priority value is assigned to each AP having a value between 1 and 10, where the value of 1 is a low priority AP such as in a warehouse location and a value of 10 is a high priority AP such as in a lobby or waiting room location.

External APs not belonging to and not controlled by the managed system, may add radio interference, and may be taken into account as part of some embodiments of the method. For example, the value $\tilde{r}_{ij}$ denotes the interference experienced by the i-th AP from the j-th external AP. It may be difficult to measure the external APs interference and load since the system may not have access to this information. Instead of the load value per AP, we may use a single load value for external APs such as, for example, the median load experienced within the controlled system, denoted here as $L_d$. One possible optimization criterion for the DCA problem in this case, for P external APs and where $\tilde{f}_1$ denotes the channel respective to the i-th external AP, may be:

$$f_1, \ldots f_N = \underset{f_1 \in [1,\ldots,M]}{\operatorname{argmin}} r_{12} \cdot (f_1 = f_2) \cdot L_1 L_2 +$$

$$r_{13} \cdot (f_1 = f_3) \cdot L_1 L_3 + \ldots + r_{1N} \cdot (f_1 = f_N) \cdot L_1 L_N +$$

$$r_{23} \cdot (f_2 = f_3) \cdot L_2 L_3 + \ldots + r_{N-1,N} \cdot (f_{N-1} = f_N) \cdot L_{N-1} L_N +$$

$$\tilde{r}_{11} \cdot (f_1 = \tilde{f}_1) \cdot L_1 L_d + \ldots \tilde{r}_{N,P} \cdot (f_N = \tilde{f}_P) \cdot L_N L_d$$

Now an example of some aspects of embodiments for computing ordering for channel combination assignment will presented. For a processor 402 to determine the order of APs over which the iterative stepwise K-Best method is performed, an initial ordering may be computed by the processor 402 as described herein.

For example, the order is used by the processor 402 to later select the first AP in the order for computing the effect of channel assignment combinations, then selects the second AP from the order, and the like. For example, the ordering function formula is based on the sum interference experienced by each AP. For each i-th AP in the system, we compute the value:

$$L_1 \sum_{j=1}^{N} r_{ij} L_j + L_i L_d \sum_{j=1}^{P} \tilde{r}_{ij}$$

which corresponds to the overall interference experienced by the i-th AP from both system APs and external APs. The APs are then ordered by each AP's overall interference, such that we later compute the effect of channel assignment combinations starting with the AP experiencing the highest interference, the next in the ordering is the AP experiencing the second highest interference, etc. The example value above consists of two summands. The first summand $$L_1 \sum_{j=1}^{N} r_{ij} L_j$$

defines the interference experienced by the i-th AP from all other not external APs as dependent on the load of the i-th AP and the other APs. The second summand $$L_i L_d \sum_{j=1}^{P} \tilde{r}_{ij}$$

defines the interference experienced by the i-th AP from the external APs as dependent on the load of the i-th AP and the median load assumed for the external APs.

In this example, the load values are neglected, such that all load values are equal to 1. In this example, the computation of the DCA solution by the processor 402 is based on the interference values between the APs. Taking into account the loads of the APs and or other wireless communication values may yield a DCA optimization closer and/or identical to the optimal solution.

For example, an ordering method which is based on the sum of each row of R, the inter AP interference matrix, so that we start with the AP featuring the maximal value corresponding to the AP experiencing the maximal interference from neighboring APs. Note that high load APs tend to interfere more with nearby APs operating at the same channel, and similarly tend to be interfered more from nearby APs.

Figure 4:
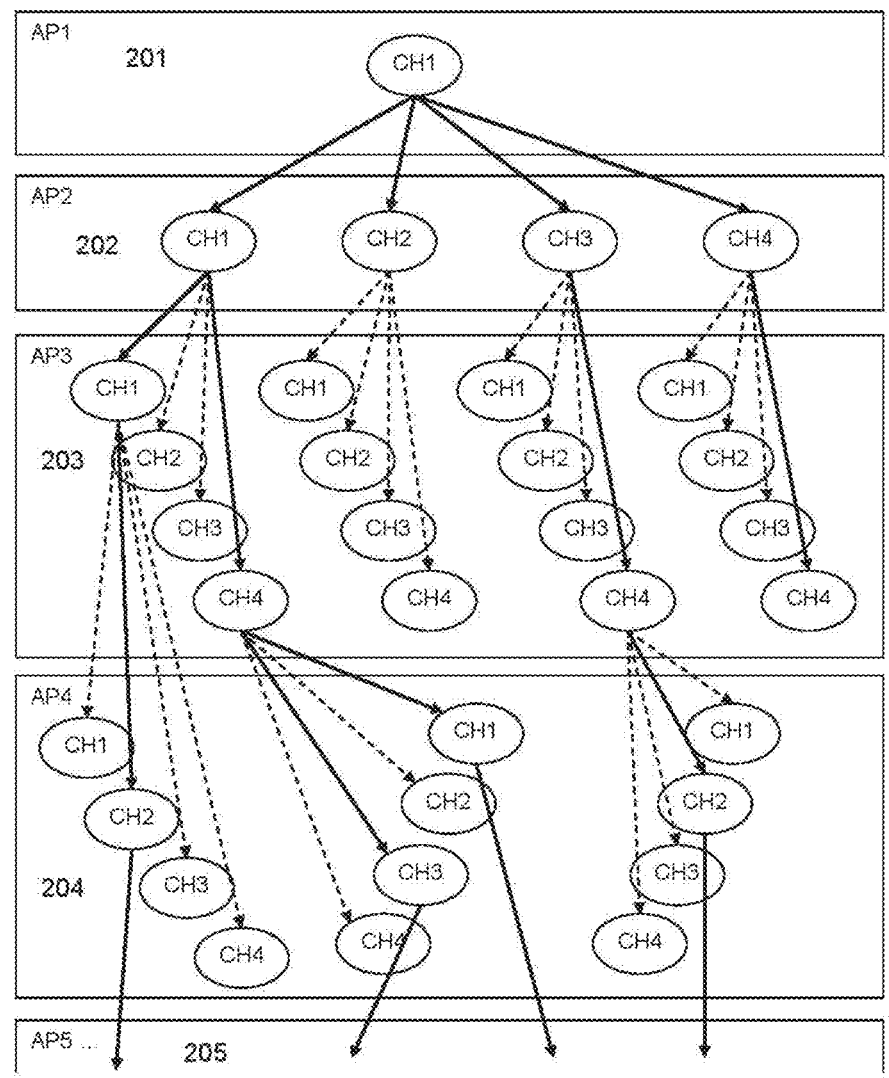
FIG. 4 is a tree graph of an example group of channel combinations showing a stage by stage discarding of certain combinations, according to some embodiments of the invention.

Reference is now made to FIG. 4, which is a tree graph of an example group of channel combinations showing a stage by stage discarding by the processor 402 of certain combinations, according to some embodiments of the invention. For illustration purposes, this example shows a graphical representation of potential channel combination assignments as a rooted tree graph that may be truncated by the processor 402 at any stage, representing discarded combinations. The tree root is the channel assignment to the first access point (in this case AP1) in the ordered list. At each stage of the example method, the processor 402 chooses the next access point in the ordered list for assigning combinations of available channels, and adds these to each previous stage surviving branches. As used herein, the term branch means any path along edges of a tree from the root to a leaf. As used herein, the term stage means an iteration of the method in computing the effect of channel assignments to an access point. In the first iteration of the example method, AP1 is assigned by the processor 402 a simulated channel allocation of CH1 as at 201. In the second iteration, channels CH1, CH2, CH3, and CH4 are allocated by the processor 402 to AP2 as at 202. Cost functions are computed automatically by a computerized processor 402. When the number of combinations is less than a threshold value, all combinations are preserved by the processor 402 for the next transceiver's channel assignments. In the next iteration of channel combination assignments, AP3 is allocated by the processor 402 the same 4 channels as at 203 and the cost functions is computed by the processor 402 again for each combination. Values of cost functions of each combination are ranked by the processor 402 and the combinations with the highest cost function values discarded, as illustrated by the dashed lines. The remaining channel combinations in the group are then combined by the processor 402 with channel combinations for the next AP on the list, for example AP4 as at 204. The process of computing a cost function for these combinations and discarding the high cost function combinations is repeated for the other radio transceivers. These iterations are continued as at 205 until all radio transceivers in the network have been added to the combinations, and then the combination with the lowest cost function is chosen by the processor 402 as the preferred combination for channel allocation.

For example, a truncated tree graph as in FIG. 4 illustrates the search strategy by the processor 402 for the preferred combination of radio channels, where discarded channel combinations are represented by dashed lines and preserved channel combinations are represented by solid bold lines. In each stage of the method, after discarding high cost function value combinations, the combinations that remain in the group of combinations for the next radio transceiver assignment may be limited to at most K branches. For example, only 4 branches are preserved at each stage, and all other branches are discarded.

In computing the cost function value after adding new channel combinations during each stage of the method, the impact of previously ordered APs is represented in the cost function. For example, when the number of available channels is reduced, the mutual interference among all radio transceivers is increased.

In the truncated tree example, an incremental cost function is used. The tree graph represents the channel combinations where each branch of the tree from the root to the leaf represents a channel combination, and is comprised of edges and nodes. At each stage of the method another set of leaves is added to the existing branches, representing channel combinations for the AP of that stage. Each of the existing branches represents the previous surviving combinations and each of the new leaves are new channel combinations for the next AP in the ordered list. Each edge is assigned an incremental value, and each node represents one of the new channel combinations. For example, at each stage of the method for each new AP channel combinations we add to the group of previous combinations, the impact on the partial cost functional is dependent on the previous combinations until that stage.

Specifically, at stage n when there are n−1 survivors on each surviving branch, the incremental cost function is denoted by $c_n$ such that:

$$c_n = r_{1,n} \cdot (g_1 == \hat{f}_n) L_1 L_n + r_{2,n} \cdot (g_2 == \hat{f}_n) L_2 L_n + \ldots + r_{n-1,n} \cdot (g_{n-1} == \hat{f}_n) L_{n-1} L_n$$

where $g_i$ denotes the i-th node on the surviving branch and $\hat{f}_n$ denotes the examined node on the n-th branch.

When there are external APs, the incremental cost function may be:

$$c_n = r_{1,n} \cdot (g_1 = \hat{f}_n) L_1 L_n + \\ r_{2,n} \cdot (g_2 = \hat{f}_n) L_2 L_n + \ldots + r_{n-1,n} \cdot (g_{n-1} = \hat{f}_n) L_{n-1} L_n + \\ \tilde{r}_{n,1} \cdot (\tilde{f}_1 = \hat{f}_n) L_d L_n + \ldots \tilde{r}_{n,P} \cdot (\tilde{f}_P = \hat{f}_n) L_d L_n$$

Optionally, there are channel constraints in some APs. For example, some APs are not allowed to operate on certain channels whereas other APs are allowed to operate on all available channels. For example, for some stages the number of available channels is lower, and hence number of branches in the truncated tree graph is lower than at other stages.

When all radio transceivers have been assigned channel combinations, the overall cost function value is computed as the sum of incremental costs $c_n$ over all surviving branches in the truncated tree. The branch with the smallest overall cost is chosen as the preferred channel combination and hence used to allocate the selected channels to each AP.

For example, a detailed scenario with 9 APs and 3 available radio channels is given in this herein, including ordering and computing the incremental and aggregate cost for each node. In this example, the APs are denoted by AP1, AP2, AP3 and the like and channels are denoted by CH1, CH2, CH3 and the like.

In this example, at each stage channel combinations are discarded so that only 10 combinations are retained for the next stage. The mutual radio interference matrix $R_{9 \times 9}$ is:

$$R = \begin{bmatrix} 0 & 1 & 0.0631 & 1 & 0.2512 & 0.0398 & 0.0631 & 0.0398 & 0.0158 \\ 1 & 0 & 1 & 0.2512 & 1 & 0.2512 & 0.0398 & 0.0631 & 0.0398 \\ 0.0631 & 1 & 0 & 0.0398 & 0.2512 & 1 & 0.0158 & 0.0398 & 0.0631 \\ 1 & 0.2512 & 0.0398 & 0 & 1 & 0.0631 & 1 & 0.2512 & 0.0398 \\ 0.2512 & 1 & 0.2512 & 1 & 0 & 1 & 0.2512 & 1 & 0.2512 \\ 0.0398 & 0.2512 & 1 & 0.0631 & 1 & 0 & 0.0398 & 0.2512 & 1 \\ 0.0631 & 0.0398 & 0.0158 & 1 & 0.2512 & 0.0398 & 0 & 1 & 0.0631 \\ 0.0398 & 0.0631 & 0.0398 & 0.2512 & 1 & 0.2512 & 1 & 0 & 1 \\ 0.0158 & 0.0398 & 0.0631 & 0.0398 & 0.2512 & 1 & 0.0631 & 1 & 0 \end{bmatrix}$$

For example, AP1 sees AP2 with an interference value of 1 and vice versa, AP1 sees AP3 with interference value 0.0631, and the like. The external interference matrix may be:

$$R^{external} = \begin{bmatrix} 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \\ 1.5849 \cdot 10^{-13} & 1.5849 \cdot 10^{-13} & 1.5849 \cdot 10^{-13} \end{bmatrix}$$

which in this example represents that all 9 network APs see 3 external APs, and each network AP experiences the same interference from the external APs. The load vector is:

$$Load = \begin{bmatrix} 1 \\ 1 \\ 1 \\ 1 \\ 1 \\ 1 \\ 1 \\ 1 \\ 1 \end{bmatrix}$$

which in this example corresponds to the loads being the same for all APs, and the median load is $L_d=1$.

In this example, an ordering is computed using the equation:

$$L_i \sum_{j=1}^{9} r_{ij} L_j + L_i L_d \sum_{j=1}^{3} \tilde{r}_{ij} = \begin{bmatrix} 2.4729 \\ 3.6451 \\ 2.4729 \\ 3.6451 \\ 5.0048 \\ 3.6451 \\ 3.4098 \\ 3.6451 \\ 2.4729 \end{bmatrix}$$

which yields an ordering of APs order=[5 2 4 6 8 7 1 3 9]. In other words, the AP5 is assigned channel combination first, the 2nd AP second, and the like.

Figure 3A:
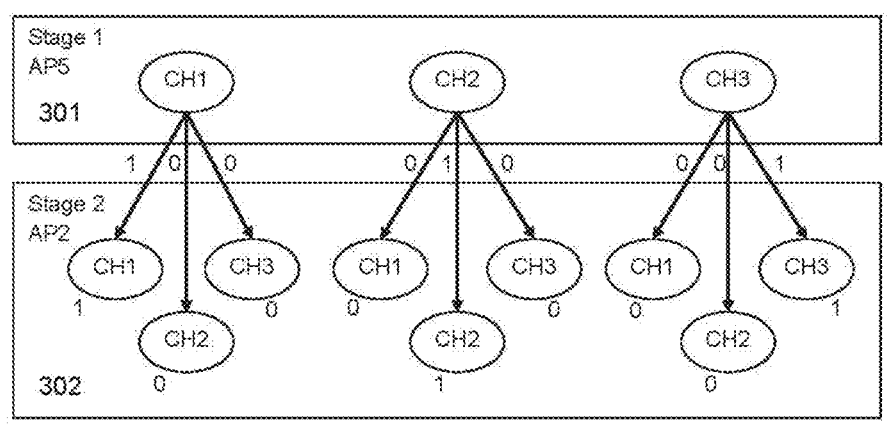
FIG. 3A is a graph of an example assignment of combinations of radio channels for two access points using wireless communication values, according to some embodiments of the invention.

Reference is now made to FIG. 3A, which is a graph of an example assignment of combinations of radio channels for two access points using wireless communication values, according to some embodiments of the invention.

For each available wireless channel a rooted tree is generated. The root is formed by the corresponding wireless channel. We assume K=10.

In this example, at the first stage, we consider all 3 channels for AP5 as at 301. Since this is the first stage, there is no cost associated yet and all three combinations are considered previous combinations. At the second stage 302, we consider all 3 channels as leaves for all channel nodes from the first stage, this time for AP2. For each leaf, a cost may be associated. For example, the cost associated with allocating CH1 to AP5 and CH2 to AP2 is 0 since there is no interference between them. The cost associated with allocating CH2 to AP5 and CH2 to AP2 is 1, since the same channel is used at both and the value in location (5.2) of the matrix $R_{9\times 9}$ is 1. At this stage of the example, the number of branches is smaller than 10, no combinations are discarded, and all 9 branches are considered as previous combinations for the next stage.

Figure 3B:
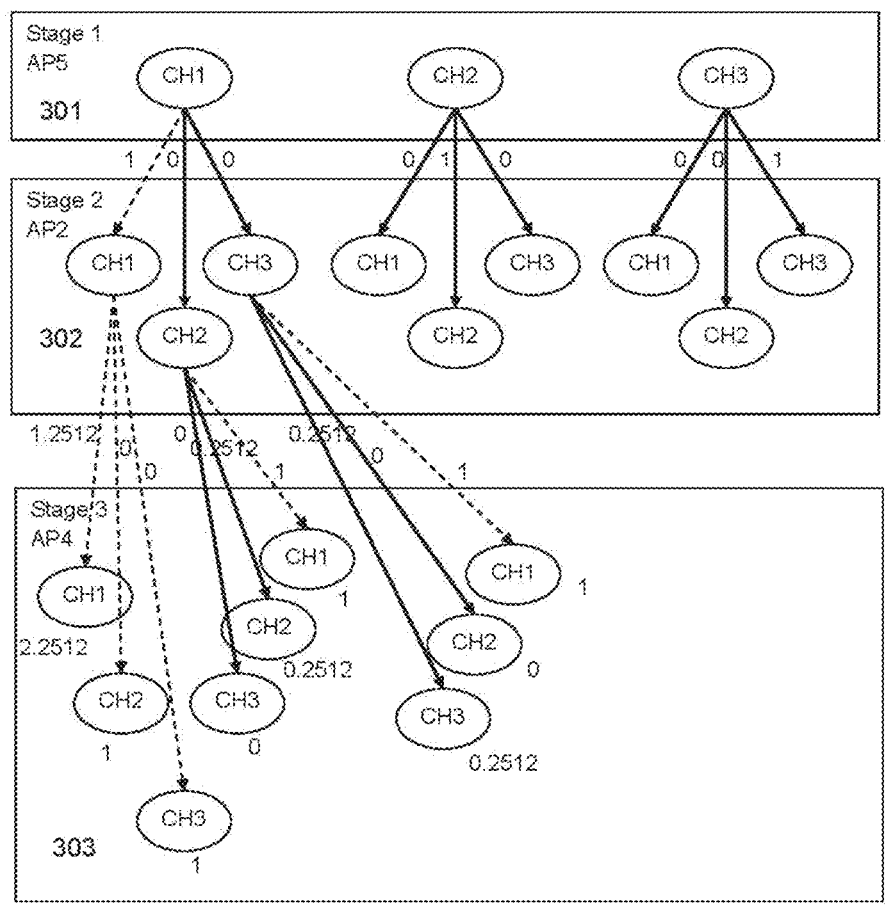
FIG. 3B is further stages of the graph shown in FIG. 3A, according to some embodiments of the invention.
Figure 3C:
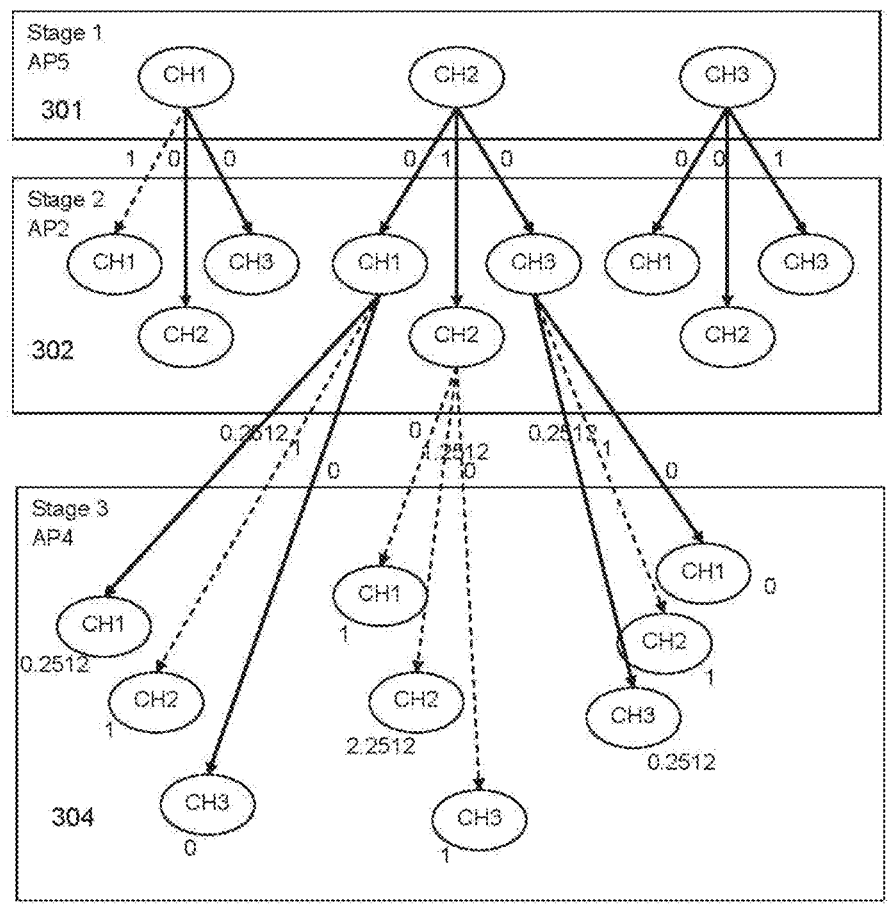
FIG. 3C is further stages of the graph shown in FIG. 3B, according to some embodiments of the invention.
Figure 3D:
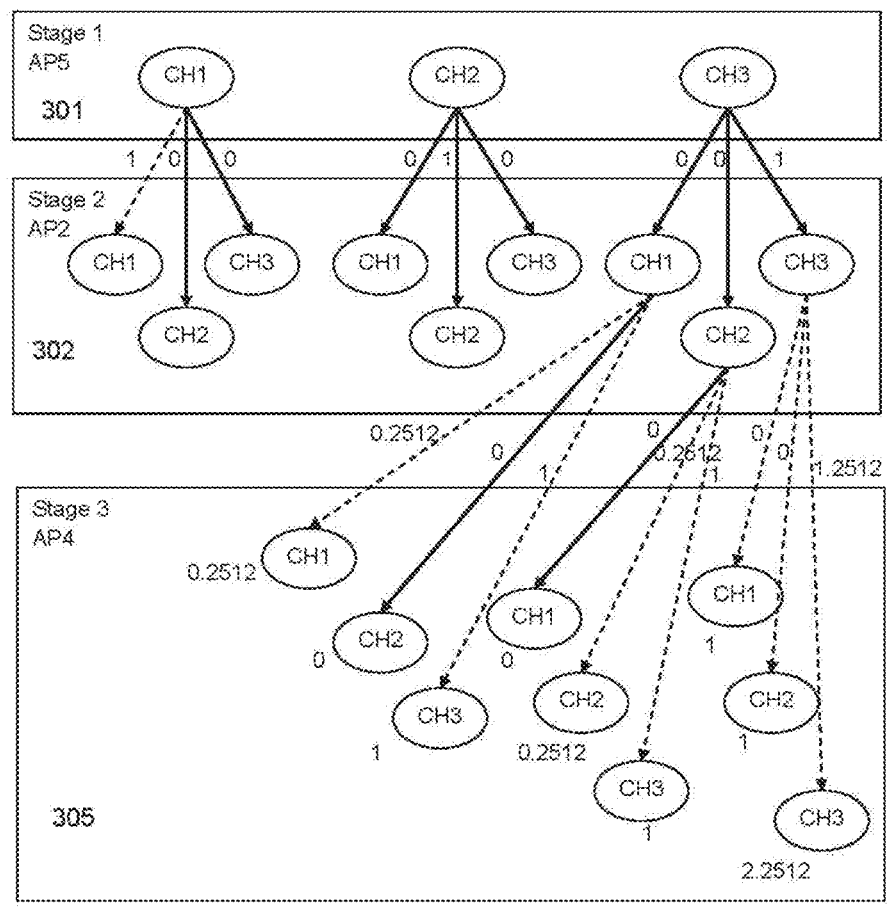
FIG. 3D is further stages of the graph shown in FIG. 3C, according to some embodiments of the invention.

Reference is now made to FIG. 3B, which is a further stage of the graph shown in FIG. 3A. Reference is now made to FIG. 3C, further stages of the graph shown in FIG. 3B. Reference is now made to FIG. 3D, which is further stages of the graph shown in FIG. 3C. At the second stage of the example, we consider all 3 channels as new leaves for all surviving branches, which in this example are all 9 branches as at 302. For AP4, therefore we have 27 new leaves as at 303, 304, and 305. For all new branches we compute the overall cost as the previous stage costs and the cost for new leaves.

For example, the cost associated with allocating CH1 to AP5, CH2 to AP2 and CH2 to AP4 is 0.2512, denoted as branch 1-2-2, as the same channel is used for both AP2 and AP4, and the value at location (2,4) in matrix $R_{9\times 9}$ is 0.2512. As different channels are used between AP4 and AP5, the interference between them is 0, so no further costs are added. The overall cost for this branch after stage 3 is therefore be 0 for stage 1 to stage 2, and +0.2512 for stage 2 to stage 3, and thus the branch cost function value is 0.2512.

The cost associated with allocating CH2 to AP5, CH2 to AP2 and CH2 to AP4 is 1.2512, denoted as branch 2-2-2, since the same channel is used at all three APs, the entry in location (2.4) in matrix $R_{9\times 9}$ is 0.2512 and the entry in location (5,4) in matrix $R_{9\times 9}$ is 1, so the incremental cost is 1+0.2512=1.2512. The overall cost for this branch after stage 3 is therefore be 1 for stage 1 to stage 2, and +1.2512 for stage 2 to stage 3, thus equal to a total for the branch of 2.2512.

For this example, a load of 1 is assigned for each AP. Optionally, different loads are associated with the access points to be taken into account when calculating initial ordering and/or the cost functions.

In this example, the number of branches is larger than K=10, and the branches are truncated to 10 surviving branches which represent the combinations with the lowest overall cost. In the figures, the surviving branches or branches are depicted by solid lines and the discarded branches by the dashed lines in the figures.

The following example is similar to the above example of channel assignment combinations, but using a table data structure instead of a rooted tree data structure.

Reference is now made to FIG. 3E, which is a table of an example assignment of combinations of radio channels for two access points using wireless communication values, according to some embodiments of the invention. This example is shown in tabular format as at 310, where the combinations of AP5 and AP2 are shown in each row of the table. For example, the combination of CH1 assigned to AP5 and CH1 assigned to AP2 has an incremental cost of 1 as at 311 and is not discarded. Similarly, the other combinations are shown in the rows of the table 310.

Reference is now made to FIG. 3F, which is further stages of the table shown in FIG. 3E, according to some embodiments of the invention. This example shows the channel combinations in tabular format 320 for stage 3, where combinations are shown in each row of the table. For example, combination 3221 assigns CH2 to AP5, CH2 to AP2, and CH1 to AP4. The cost for this combination is 1 for stage 1 to stage 2, and 0 for stage 2 to stage 3. Thus the overall cost function value for combination 3221 is 1. The last column of the table 320 shows the decision to retain or discard each channel combination according to a 95% confidence interval, where combinations with overall cost function values greater than 0.273 are discarded.

Reference is now made to FIG. 3G, which is further stages of the table 330 shown in FIG. 3F, according to some embodiments of the invention. This example shows the channel combinations in tabular format 320 for stage 4, where combinations are shown in each row of the table. This stage adds channel combinations for AP6 to the surviving channel combinations from stage 3. For example, combination 32111 assigns CH2 to AP5, CH1 to AP2, CH1 to AP4, and CH1 to AP6. The cost for this combination is 0 for stage 1 to stage 2, 0.2512 for stage 2 to stage 3, and 03143 for stage 3 to stage 4. Thus the overall cost function value for combination 32111 is 0.5655. The last column of the table 320 shows the decision to retain or discard each channel combination according to a 95% confidence interval, where combinations with overall cost function values greater than 0.148 are discarded.

In this example, further stages are repeated until all APs have been assigned channel combinations. When the stages are complete, the branch which yields the smallest overall cost is chosen as the preferred radio channel combination, and this combination of channels allocated to the respective radio transceivers.

Optionally, the methods described herein are performed by a single device, such as an AP Controller. An AP controller may be any device connected to all APs and able to communicate with the APs. Optionally, one of the network APs carries out the computations for all APs, such as a Master AP. Optionally, the example computations are performed on a device at a remote location connected to the internet.

As the K-best method resulting channel assignments depends on the ordering stage, multiple ordering methods may determine channel allocations with better overall network performance. In multiple ordering, the ordering phase is repeated several times with variation on the computed order and the K-best method is performed for each perturbed order. An example for such perturbations is the addition of random values to the ordering values or randomly varying the ordering values. After the preferred channel assignment combinations for all order perturbations are computed, the combination associated with minimal cost may be selected. For example, invoking the method several times results in feasible run-times and ensures that a close to optimal combination is found. Optionally, the median of the preferred channel assignment combinations is chosen for radio transceiver channel allocation. Optionally, when the variance in channel combinations is large the number of discarded channels may be reduced. Optionally, outlier combinations are discarded from the multiple preferred combinations. For example, if the preferred combinations were computed for 10 ordered lists, and two of those ordered list had significantly different channel assignment combinations, these different combinations are discarded and the average channel assignment combinations are used to allocate channels to the radio transceivers.

The methods described herein may provide optimal and/or near-optimal channel allocation reasonable run times, on the order of milliseconds for typical allocation scenarios.

Optionally, the methods described herein do not require knowledge of the location of the APs, and only require inter-AP wireless communication values.

The number of computations required to determine the preferred channel allocation using a K-Best DCA method is much lower than the number of computations for an exhaustive search which computes the cost function for all possible combinations.

Figure 6A:
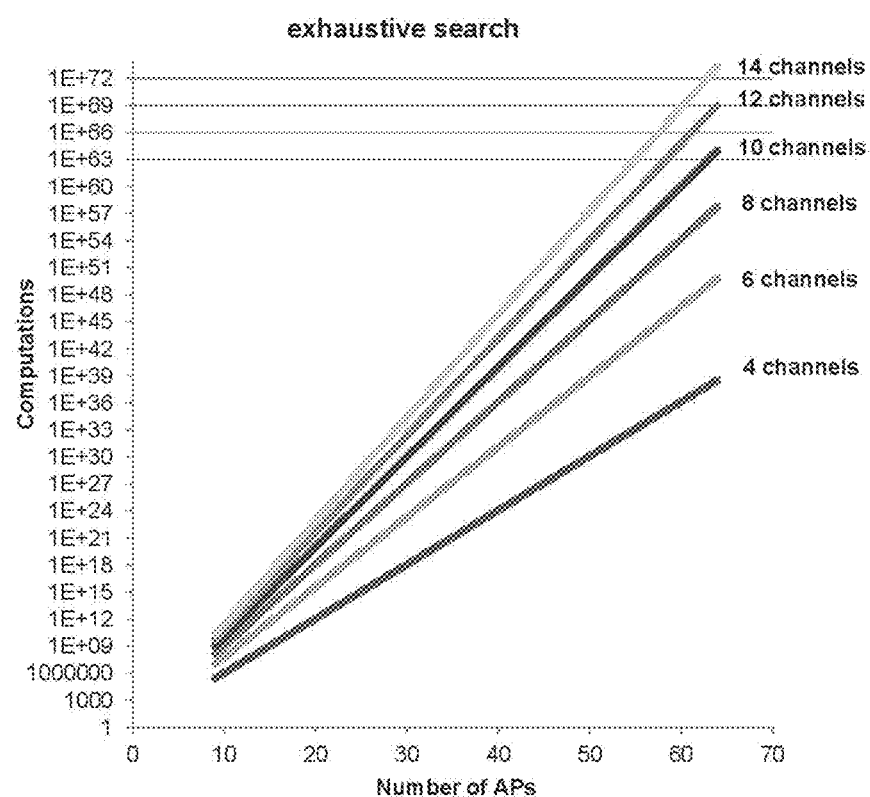
FIG. 6A is a graph of the number of computations versus number of access points for different number of radio channels using a dynamic channel allocation exhaustive search method, according to some embodiments of the invention.

Reference is now made to FIG. 6A, which is a graph of the number of computations versus number of access points for different number of radio channels using a dynamic channel allocation exhaustive search method, according to some embodiments of the invention. In the figure, the number of computations required as a function of the number of APs is shown, for various numbers of available channels. As shown, the number of computations for greater than or equal to 20 APs exceeds 10 billion computations.

Figure 6B:
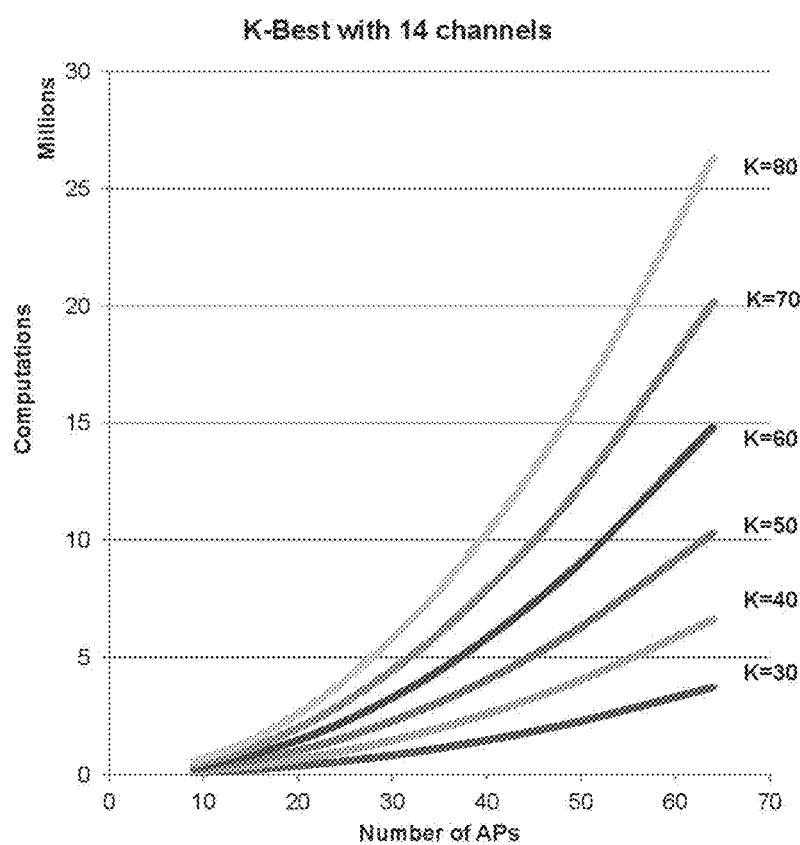
FIG. 6B is a graph of the number of computations versus number of access points for 14 radio channels and different numbers of combination retention values using a dynamic channel allocation K-Best method, according to some embodiments of the invention.

Reference is now made to FIG. 6B, which is a graph of the number of computations versus number of access points for 14 radio channels and different numbers of combination retention values using a dynamic channel allocation K-Best method, according to some embodiments of the invention. As shown, the number of computations for 60 APs and above doesn't exceed 30 million which is less than 10 billion for 20 APs using the exhaustive search method, so the complexity is far lower than that of the exhaustive search solution. For example, using the exhaustive search method with 60 APs and 14 channels would require on the order of $10^{70}$ computations, as opposed to $10^7$ using a K-Best method.

In order to further evaluate the advantages, the time required to complete the allocation using different methods are compared.

Figure 6C:
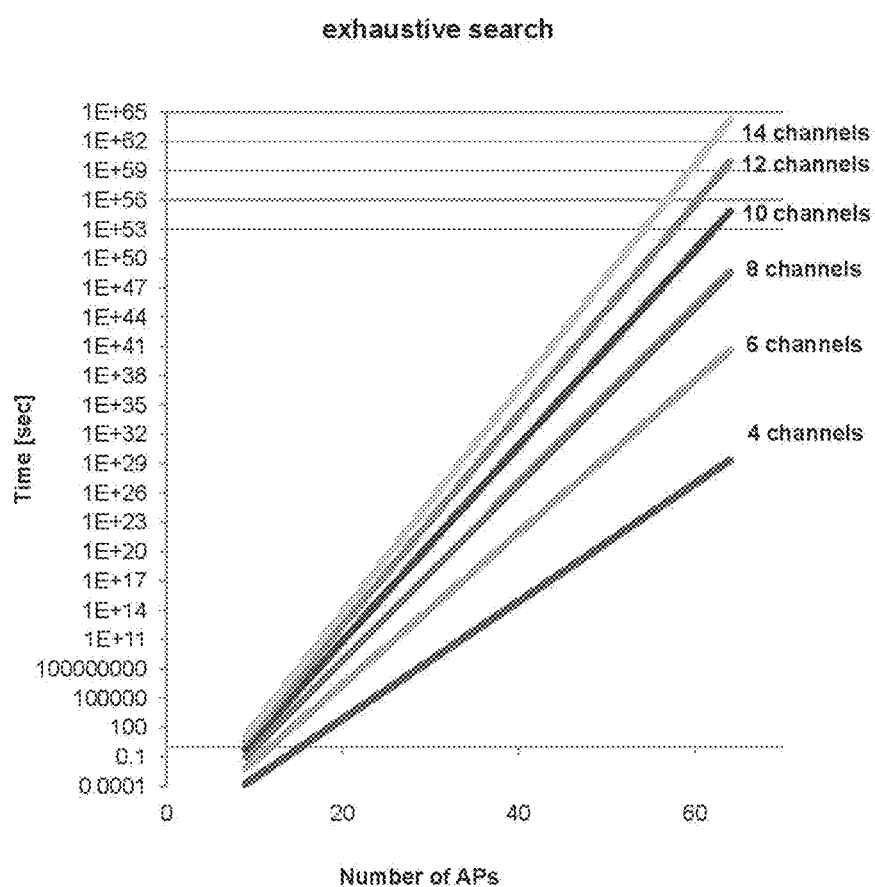
FIG. 6C is a graph of the computation time versus number of access points for different number of radio channels using a dynamic channel allocation exhaustive search method, according to some embodiments of the invention.

Reference is now made to FIG. 6C, which is a graph of the computation time versus number of access points for different number of radio channels using a dynamic channel allocation exhaustive search method, according to some embodiments of the invention. The figure shows that the time required to calculate the optimal channel allocation even using a small number of APs and/or channel becomes prohibitive, for example allocating 8 channels for 15 APs would require about 3 hours.

Figure 6D:
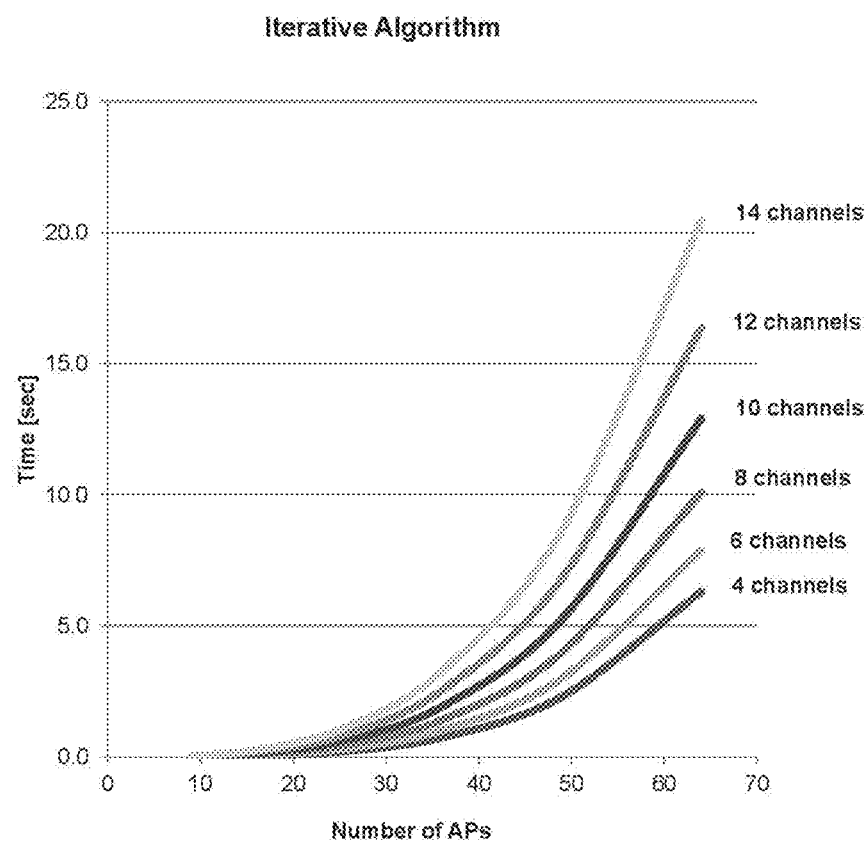
FIG. 6D is a graph of the computation time versus number of access points for different number of radio channels using a dynamic channel allocation iterative algorithm method, according to some embodiments of the invention.

Reference is now made to FIG. 6D, which is a graph of the computation time versus number of access points for different number of radio channels using a dynamic channel allocation iterative algorithm method, according to some embodiments of the invention. As shown, the time required is quite small—less than 20 sec even for a large value of available channels. However, the iterative method doesn't always yield the optimal solution.

Figure 6E:
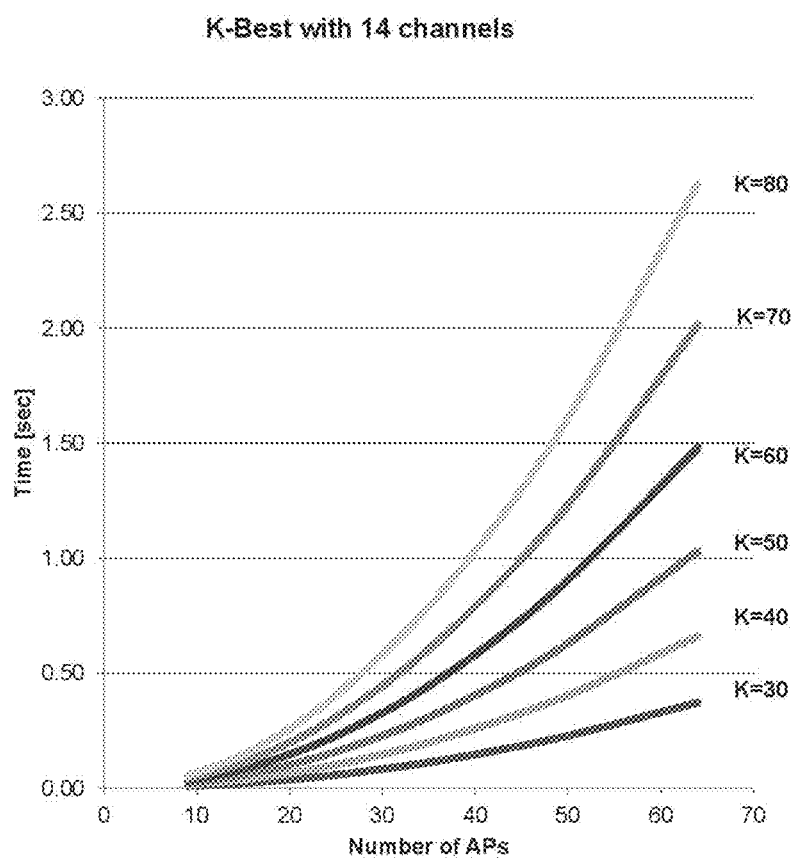
FIG. 6E is a graph of the computation time versus number of access points for 14 radio channels and different numbers of combination retention values using a dynamic channel allocation K-Best method, according to some embodiments of the invention.

Reference is now made to FIG. 6E, which is a graph of the computation time versus number of access points for 14 radio channels and different numbers of combination retention values using a dynamic channel allocation K-Best method, according to some embodiments of the invention. As shown, the time required is very small—less than 3 sec even for a large value of retained combinations.

The wireless communication values used for ordering of the AP channel assignments and computation of the cost function values may be selected from a variety of values associated with the wireless network and/or the radio transceivers. For example, mutual interferences between the APs of the network are used as wireless communication values. For example, interference between the APs of the network and external APs of different networks are used as wireless communication values. For example, interference noise between the APs of the network and other electronic and/or radio devices are used as wireless communication values. For example, signal strengths between the APs of the network are used as wireless communication values. For example, peak and/or average load of each AP is used as wireless communication values. For example, priority of each AP is used as wireless communication values.

Optionally channels are limited at each access point to channels that avoid noise sources.

Optionally, DCA is used in wireless mesh networks. As used herein, the term wireless mesh network means a communications network made up of radio transceivers nodes organized in a multiple peer-to-peer mesh topology and consisting of clients, routers and gateways. The mesh network clients may be laptops, mobile phones and other wireless radio devices. Mesh network routers forward traffic to and from the gateways which may be connected to the Internet. The sharing of radio resources by the clients to forward network traffic to each other and/or the gateways may benefit from using the k-best methods described herein.

Figure 5:
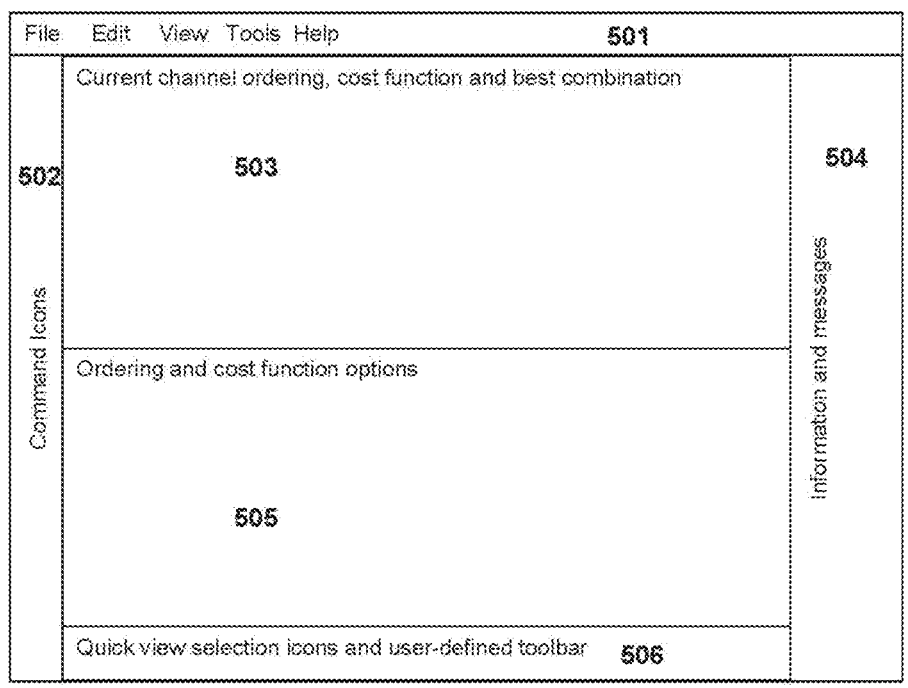
FIG. 5 is a schematic illustration of a user interface to allocate radio channels to radio transceivers, according to some embodiments of the invention.

Reference is now made to FIG. 5, which is a schematic illustration of a user interface to allocate radio channels to radio transceivers, according to some embodiments of the invention. The user interface may contain a command menu region as at 501. The user interface may contain a command icon region as at 502. The user interface may contain a current channel ordering region as at 503. The user interface may contain an information and message region as at 504. The user interface may contain an ordering and cost function option region as at 505. The user interface may contain a quickview selection and user defined toolbar region as at 506.

Optionally a user interface is implemented using a web interface.

Optionally, a user interface is implemented using a discrete electronic switch array selection, such as dual-inline-package (DIP) switches.

Optionally, a user interface is implemented using a display, keyboard and/or mouse.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant radio transceivers will be developed and the scope of the term radio transceiver is intended to include all such new technologies a priori.

It is expected that during the life of a patent maturing from this application many relevant radio networks will be developed and the scope of the term radio network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for assigning radio channels to radio transceiver devices, the device comprising:
    an interface configured to receive a plurality of radio communication values, each radio communication value being associated with at least one of a plurality of radio transceiver devices; and
    a processor coupled to the interface and configured to:
        calculate an ordering of a plurality of radio transceiver devices based on the plurality of radio communication values;
        build, according to the ordering of the plurality of radio transceiver devices, at least one rooted tree having a root and a plurality of tree stages, each one of the plurality of tree stages representing one of the plurality of radio transceiver devices chosen according to the ordering of the plurality of radio transceiver devices, the root representing an assignment of one of a plurality of available radio channels to a first radio transceiver device according to the ordering of the plurality of radio transceiver devices, each node in each of the plurality of tree stages representing an assignment of one of the plurality of available radio channels to one of the plurality of radio transceiver devices represented by a corresponding one of the plurality of tree stages, and each edge being associated with an edge value equal to an incremental cost function value calculated from the plurality of radio communication values;
        select a branch of the rooted tree according to a final cost function value calculated from the edge values along the branch, the branch comprising all nodes and edges along a path from the root to a leaf of the branch, and the branch defining a selection of one of the plurality of available radio channels for each of the plurality of radio transceiver devices; and
        assign the plurality of available radio channels to the plurality of radio transceiver devices according to the selected branch
    wherein the interface is configured to receive a plurality of mutual radio transceiver interference values, each of the plurality of mutual radio transceiver interference values being measured by one of the plurality of radio transceiver devices based on a strength of a radio signal transmitted from a second of the plurality of radio transceiver devices.

2. The device of claim 1, wherein the interface is configured to receive a plurality of radio communication values, the plurality of radio communication values are any from a list of an interfering electronic noise, a radio frequency electromagnetic radiation Gaussian noise, a radio frequency electromagnetic radiation white noise, a radio transceiver interference, a mutual radio transceiver interference, an off-network radio transceiver interference for which a channel assignment cannot be performed, a radio transceiver load, a radio transceiver priority, a radio transceiver utilization, radio transceiver transmission energy, and radio transceiver reception energy.

3. The device of claim 1, wherein the processor is configured to calculate the incremental cost function value for a given edge of the rooted tree based on all assignments of wireless channels to wireless radio transceiver devices in a path starting from the root of the rooted tree along the given edge until a node at an end of the given edge and the path.

4. The device of claim 1, wherein the processor is configured to calculate the final cost function value comprising a sum of the edge values along the selected branch.

5. The device of claim 1, wherein the processor is configured to calculate the ordering of the plurality of radio transceiver devices based on an ordering function value computed from at least one of the plurality of radio communication values for each of the plurality of radio transceiver devices, and a ranking of the ordering function value.

6. The device of claim 5, wherein the processor is configured to modify the ordering of the plurality of radio transceiver devices by at least one rearranging of the ordering.

7. The device of claim 5, wherein the processor is configured to stratify the ordering of the plurality of radio transceiver devices into groups and to randomly rearrange the ordering of the plurality of radio transceiver devices within each stratified group.

8. The device of claim 1, wherein the processor is configured to remove at least one incomplete branch during building of the rooted tree, based on an intermediate cost function comprising a sum of the edge values along the incomplete branch.

9. The device of claim 1, wherein the processor is further configured to remove at least one incomplete branch during building of the rooted tree until a target number of surviving branches of the rooted tree is reached.

10. The device of claim 1, wherein the processor is further configured to remove at least one incomplete branch during building of the rooted tree based on a statistical ranking of an intermediate sum and a statistical value threshold.

11. The device of claim 1, wherein the processor is configured to repeat calculating the ordering of the plurality of radio transceiver devices, building the rooted tree having the root and the plurality of tree stages, and selecting the branch of the rooted tree a plurality of times with different variations of the ordering of the plurality of radio transceiver devices, and assign the plurality of available radio channels to the plurality of radio transceiver devices according to a preferred channel combination resulting from the plurality of times.

12. The device of claim 1, wherein the processor is configured to build one rooted tree for each available radio channel assigned to the first radio transceiver device according to the ordering of the plurality of radio transceiver devices.

13. A method for assigning available radio channels to radio transceiver devices connected to a radio network, the method comprising:
receiving a plurality of mutual radio transceiver interference values, each of the plurality of mutual radio transceiver interference values being associated with at least one of a plurality of radio transceiver devices, and each of the plurality of mutual radio transceiver interference values is measured by one of the plurality of radio transceiver devices based on a strength of a radio signal transmitted from a second of the plurality of radio transceiver devices;
calculating an ordering of the plurality of radio transceiver devices based on the plurality of mutual radio transceiver interference values;
building, according to the ordering, at least one rooted tree has a root and a plurality of tree stages, each one of the plurality of tree stages representing one of the plurality of radio transceiver devices chosen according to the ordering, the root representing an assignment of one of a plurality of available radio channels to a first radio transceiver device according to the ordering, each node in each of the plurality of tree stages representing an assignment of one of the plurality of available radio channels to one of the plurality of radio transceiver devices, and each edge being associated with an edge value equal to an incremental cost function value calculated from the plurality of mutual radio transceiver interference values;
selecting a branch of the rooted tree according to a final cost function value calculated from the edge values along the branch, the branch comprising all nodes and edges along a path from the root to a leaf of the branch, and the branch defining a selection of one of the plurality of available radio channels for each of the plurality of radio transceiver devices; and
assigning the plurality of available radio channels to the plurality of radio transceiver devices according to the selected branch.

14. An apparatus comprising:
a non-transitory computer readable memory storing instructions that cause a processor to implement steps comprising:
receiving a plurality of mutual radio transceiver interference values, each of the plurality of mutual radio transceiver interference values being associated with at least one of a plurality of radio transceiver devices, and each of the plurality of mutual radio transceiver interference values being measured by one of the plurality of radio transceiver devices based on a strength of a radio signal transmitted from a second of the plurality of radio transceiver devices;
calculating an ordering of the plurality of radio transceiver devices based on the plurality of mutual radio transceiver interference values;
building, according to the ordering, at least one rooted tree has a root and a plurality of tree stages, each one of the plurality of tree stages representing one of the plurality of radio transceiver devices chosen according to the ordering, the root representing an assignment of one of a plurality of available radio channels to a first radio transceiver device according to the ordering, each node in each of the plurality of tree stages representing an assignment of one of the plurality of available radio channels to one of the plurality of radio transceiver devices, and each edge being associated with an edge value equal to an incremental cost function value calculated from the plurality of mutual radio transceiver interference values;
selecting a branch of the rooted tree according to a final cost function value calculated from the edge values along the branch, the branch comprising all nodes and edges along a path from the root to a leaf of the branch, and the branch defining a selection of one of the plurality of available radio channels for each of the plurality of radio transceiver devices; and
assigning the plurality of available radio channels to the plurality of radio transceiver devices according to the selected branch.

* * * * *